United States Patent [19]
Carter et al.

[11] Patent Number: 5,953,726
[45] Date of Patent: Sep. 14, 1999

[54] METHOD AND APPARATUS FOR MAINTAINING MULTIPLE INHERITANCE CONCEPT HIERARCHIES

[75] Inventors: Gary L. Carter, Woodbridge, Conn.; Frank Castellucci, Amawalk, N.Y.; Steffen M. Fohn, Raleigh, N.C.; Arthur R. Greef, Seattle, Wash.; Thomas Maguire, Brewster, N.Y.; John F. Schumacher, White Plains, N.Y.; Robert A. Weida, New York, N.Y.

[73] Assignee: International Business Machines Corporation, Armonk, N.Y.

[21] Appl. No.: 08/976,652

[22] Filed: Nov. 24, 1997

[51] Int. Cl.$^6$ ........................................ G06F 17/30
[52] U.S. Cl. .......................... 707/103; 707/3; 707/4
[58] Field of Search ................... 707/103, 102, 707/3, 4; 345/340

[56] References Cited

U.S. PATENT DOCUMENTS

| | | | |
|---|---|---|---|
| 5,487,141 | 1/1996 | Cain et al. | 345/435 |
| 5,623,591 | 4/1997 | Cseri | 345/326 |
| 5,630,131 | 5/1997 | Palevich | 395/701 |
| 5,642,511 | 6/1997 | Chow et al. | 395/701 |
| 5,652,108 | 7/1997 | Cain et al. | 345/340 |
| 5,692,106 | 11/1997 | Towers et al. | 706/45 |

*Primary Examiner*—Wayne Amsbury
*Assistant Examiner*—Cheryl Lewis
*Attorney, Agent, or Firm*—Steven Meyers

[57] ABSTRACT

In response to the users actions relative to graphical representations of a multiple inheritance concept hierarchy to delete, add or modify the relationships between the various concepts, property declaration, property constraints and relationships therebetween, this system first, recognizes and disambiguates possible semantic incoherance introduced by the changes; second, suggests alternative procedures to ameliorate any perceived incoherence; third, interactively allows an agent (user or machine) to select from one of the alternatives; and fourth, performs the sequence of necessary operations to resolve semantic incoherence in the modified hierarchy.

21 Claims, 17 Drawing Sheets

C = PERFORMED BY COMPUTER
U = USER ACTIONS

C = PERFORMED BY COMPUTER
U = USER ACTIONS

C = PERFORMED BY COMPUTER
U = USER ACTIONS

C = PERFORMED BY COMPUTER
U = USER ACTIONS

METHOD AND APPARATUS FOR MAINTAINING MULTIPLE INHERITANCE CONCEPT HIERARCHIES

RELATED PATENT APPLICATIONS

1. U.S. patent application Ser. No. 08/472,414 filed on Jun. 7, 1995 and entitled "Method and Apparatus for Representing Knowledged About Entities", abandoned. The contents of the above identified application are hereby incorporated herein by reference.

2. U.S. patent application Ser. No. 08/977,092 filed on even date herewith and entitled "A Method and Apparatus for Navigating Multiple Inheritance Concept Hierarchies", pending. The contents of the above identified application are hereby incorporated herein by reference.

3. U.S. patent application Ser. No. 08/688,350 filed on Jul. 30, 1996 and entitled "Enhanced Tree Control System for Navigating Lattices Data Structure & Displaying Configurable Lattice Node Labels", pending. The contents of the above identified application are hereby incorporated herein by reference.

4. U.S. patent application Ser. No. 08/725,961 filed on Oct. 7, 1997 and entitled "Enhancing Feature Based Search Through Feature Relevance Reasoning", allowed. The contents of the above identified application are hereby incorporated herein by reference.

TECHNICAL FIELD

The present invention relates to a method and apparatus for modifying databases. More particularly, it relates to a computer automated method for modification of the contents of a multiple inheritance concept hierarchy database.

BACKGROUND

A hierarchy is a common method for organizing information. The table of contents for a book, an index system for a library and a function chart for a company's departments are examples of hierarchical arrangements of information. A hierarchy comprises nodes and their interrelationships. When a hierarchy interrelates structured nodes, those nodes are commonly called concepts (other terms used for nodes include scenes, frames, individuals and classes). The structure of a concept is described by the use of characteristics called properties.

The meaning given to these concepts and their hierarchical interrelationships depends on the real world domain that is being represented by the data hierarchy or structure. Structures comprising concepts and their interrelationships are commonly known as "part-of" decomposition hierarchies arid "is-a" abstraction hierarchies.

A "part-of" decomposition hierarchy is typically found in corporation departmental organization charts. Each sub-department is part-of a super-department. For example, the Electronic Catalog Division and Electronic Transaction Division are part-of the Electronic Commerce Division. The Electronic Commerce Division and Information Distribution Division are part-of the Internet Division which is in turn part-of the Software Division.

An "is-a" abstraction hierarchy is typically found in biological animal and organism classification charts. Each sub-abstraction is-a more specific (specialized) description of a super-abstraction. For example, the family of lions and the family of tigers are more specific descriptions of the family of large cats. The family of large cats and the family of humans are more specific descriptions of the family of mammals. The sub-concepts in these hierarchies usually share common properties with their super-concepts. We take advantage of this fact and minimize the amount of data we need to store by only defining common properties in a super-concept and allow sub-concepts of the super concept to "inherit" (access, use) these properties as part of their own definitions. Hierarchies with this characteristic are termed inheritance hierarchies. When a sub-concept can interrelate to only one super-concept, the hierarchy is termed a single inheritance concept hierarchy, and when a sub-concept can interrelate to more than one super-concept, the hierarchy is termed a multiple inheritance concept hierarchy. An example of a multiple inheritance concept hierarchy is found in the above mentioned U.S. application, Ser. No. 08/472,414, abandoned.

A way of visualizing these hierarchical data structures is by using a tree view as shown in FIG. 1. One method for visualizing any structured node in the tree view of FIG. 1, in combination with that node's properties, would be to use a concept view as shown in FIG. 2. The example given in FIG. 2 is for the "Mobile" structured concept 101 of FIG. 1.

With these two views, a user can navigate the concept hierarchy shown in FIG. 1 by starting at the root concepts "Company" or "Function" and continue thru the sub-concepts until the leaf concepts are reached. At each concept, a concept view, such as the one of FIG. 2, can be consulted for a detailed examination of the structure of the concept. Switching back and forth between hierarchial and concept type views is a popular method of investigating concept hierarchies.

The data structure shown in FIGS. 1 and 2 is created and maintained by either a human agent using a Graphic User Interface (GUI) (e.g. an information architect) or a computer agent (a software program acting on behalf of a human). A human or agent incrementally creates the data structure, representing some domain in the real world, by first adding base concepts and their property definitions. Ideally, this creation process would continue until the entire data structure is created and the whole domain is succinctly represented. In reality, however, the process of realizing a final data structure is one of continual revision and refinement. There is a continual cyclical process of creation and modification as new concepts are introduced and old ones modified.

The problem is that it is time intensive to manually recover the semantics of the hierarchy when modifying a concept's properties or interrelationships. This time expense is measured in human hours when a human is modifying the data structure and machine hours when a program is performing the modification. In both cases, the most expensive operations are those modifications done at the top of the hierarchy as it often affects all of the other sub-concepts in the hierarchy.

Modification is expensive because of the nature of hierarchical data structures with inheritance. Many of the concepts and their properties are highly interrelated and non-localized. The creation of the hierarchy is a process of building increasing complex data structures upon previously created data structures. Until now, humans and computers have had to manually reverse the creation process to effectively reset the data structure to the state it was in prior to the creation of the data structure to be modified. Often this process is so expensive and arduous that it is easier to recreate the structure than undo the creation process, make the modification and then recreate what was just undone.

BRIEF DESCRIPTION OF THE INVENTION

In accordance with the present invention, the problem of modification of the data structure is solved by providing a computer automated method for interactively maintaining the semantics of concept hierarchies when concept properties and concept interrelationships are modified. In response to the users actions relative to graphical representations of the hierarchy, such as those of FIGS. 1 and 2, to delete, add or modify the relationships between the various concepts, property declarations, property constraints and relationships therebetween, the present invention first recognizes and disambiguates possible semantic incoherence introduced by the changes, second, suggests alternative procedures to ameliorate any perceived incoherence, third, interactively allows an agent (user or machine) to select from one of the alternatives, and fourth, performs the sequence of necessary operations to resolve semantic incoherence in the modified hierarchy.

Therefore, it is an object of the present invention to provide a computer directed method for interactively modifying multiple inheritance concept hierarchies.

It is another object of the present invention to maintain semantic coherence when modifying multiple inheritance concept hierarchies.

BRIEF DESCRIPTION OF THE DRAWINGS

These and other objects, features and advantages of the invention can best be understood by reference to the following detailed description while making reference to the accompanying drawings of which.

DETAILED DESCRIPTION OF THE INVENTION

Figure 3:
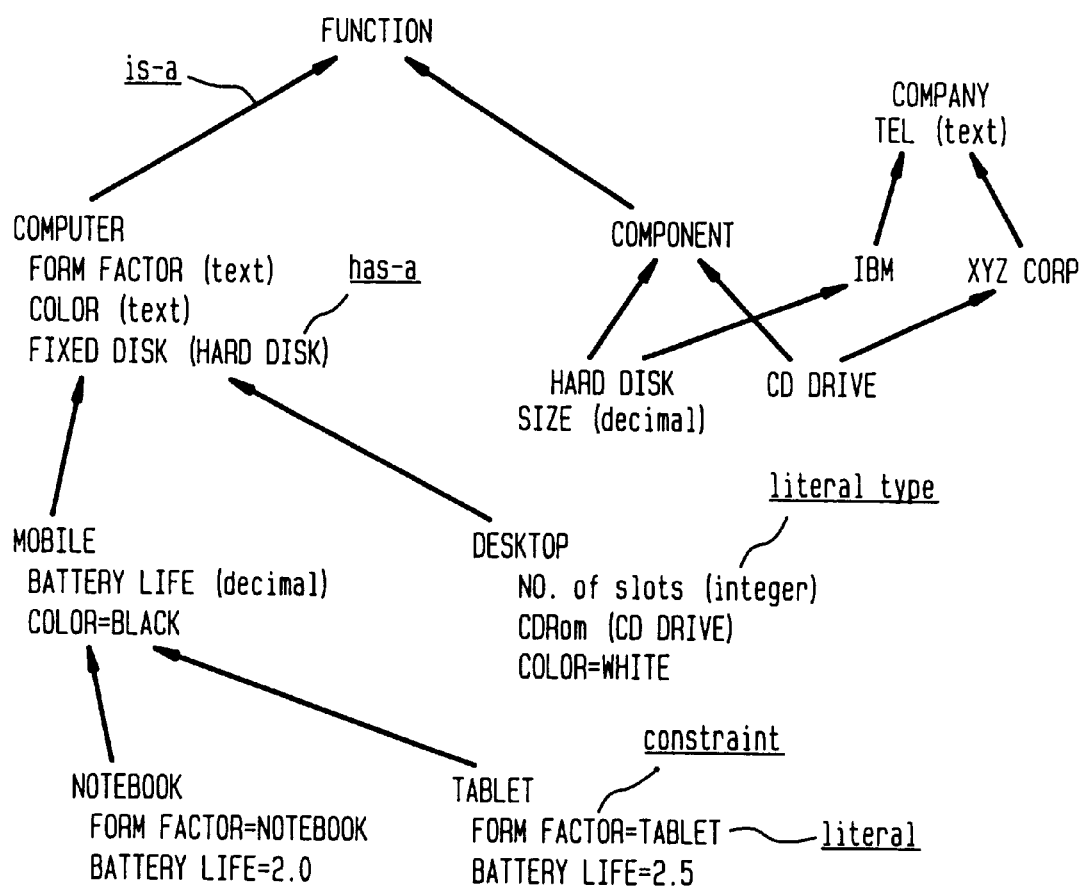
FIG. 3 is a graphical representation of a multiple inheritance concept hierarchy to which the present invention applies.

In FIG. 3, the concepts "Function" and "company" are termed "root" concepts (they have no super-concepts) and concepts "Notebook", "Tablet", "Desktop", "Hard Disk" and "CD Drive" are termed "leaf" concepts (they have no sub-concepts). The concept "Hard Disk" inherits properties from both the concepts "Component" and "IBM". Properties that have been inherited by a sub-concept from a super-concept are termed "inherited properties" of the sub-concept. Those that are declared within a concept are termed "local properties" of the concept.

In making a change in the structure of a hierarchy, the effect the changed portion has on the remainder of the hierarchy must be taken into account. For instance in FIG. 3, assume the concept "Mobile" is to be eliminated, the declaration of "Battery Life" and the constraint of "Black" for the declaration "Color". If "Desktop" computers are to be black rather than white, this constraint could be moved to the concept "Computer" since the restriction would apply equally well to "Notebook", "Tablet" and "Desktop" computers. Otherwise, the constraint must be listed in both the "Notebook" and "Tablet" concepts. Since "Battery Life" does not apply to "Desktop", that declaration must be dropped to the leaf concepts of "Notebook" and "Tablet".

Therefore, it is understood that rules used to establish the hierarchy must be followed when portions of the hierarchy is changed, deleted or added to. These rules are first checked when concepts, concept interrelationships and properties are created. The rules must then be enforced when modifying the data structure. The rules are:

1. The graph formed by the concept hierarchical interrelationships must not contain cycles, For example, in FIG. 1, we could not have "Mobile" as a sub-concept of "Computer" and "Computer" a sub-concept of "Mobile".

2. A super-concept must always exist if it ha; interrelated sub-concepts. For example, in FIG. 1, the concept "Computer" must always exist if the concepts "Mobile" and "Desktop" are its sub-concepts.

3. The type of a property must always exist. For example, in FIG. 1, the property "Fixed Disk (Hard Disk) always relies on the existence of the concept "Hard Disk". The concept "Hard Disk" cannot be removed if there are properties that depend on its existence as a type of a property.

4. A property must always exist if there is a constraint that constrains the property. For example, in FIG. 1, the "Form Factor" property declaration in concept "Computer" must always exist while the constrains "Form Factor=Notebook" and "Form Factor=Tablet" depend on its existence.

5. A property can only be constrained at a concept if the property declaration is accessible at that concept i.e., the property is either declared in the same concept as the constraint or the property can be inherited for some super-concept in its lineage. For example, in FIG. 1, the property "Battery Life" in concept "Mobile" cannot be constrained in the concept "Desktop". The property declaration is not accessible to the concept "Desktop". The property can, however, be constrained at both the concept "Mobile" and the concepts "Notebook" and "tablet".

6. No two properties can have the same name in the same concept. For example, in FIG. 1, it is not possible to declare another property "Form Factor (integer)" in concept "Computer".

Figures 1, 2:
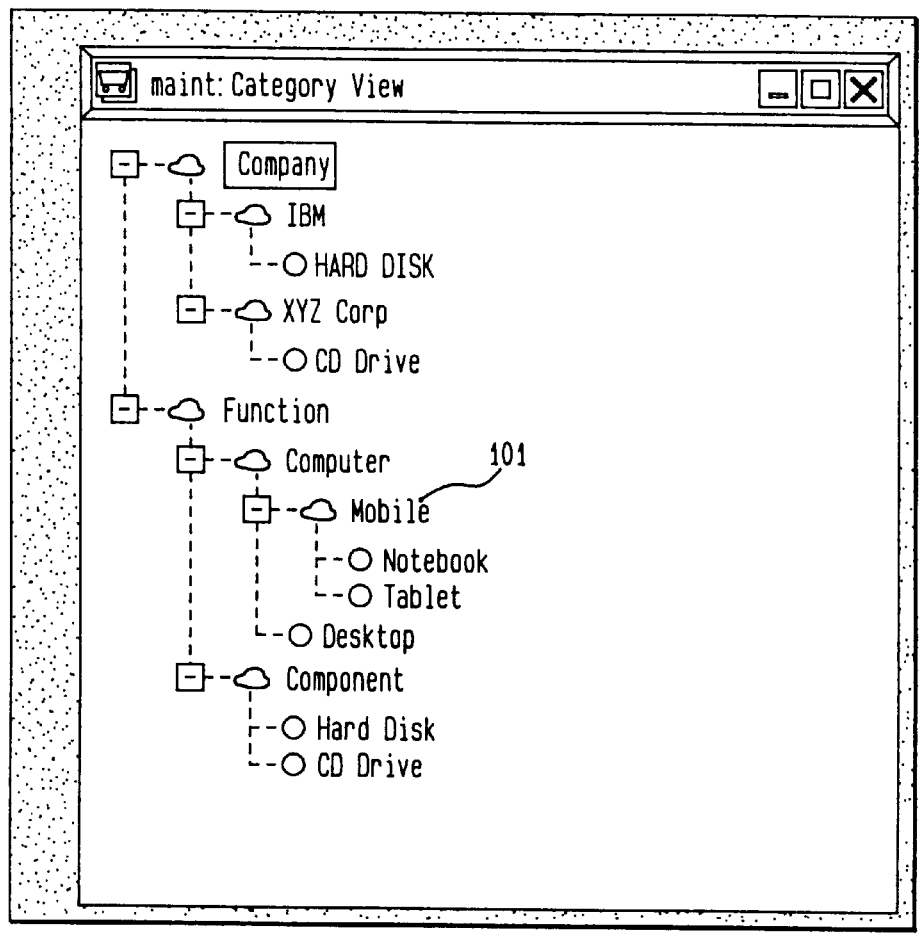
FIG. 1 is a computer screen presentation showing a hierarchial view of the concepts in a database.
FIG. 2 is a computer screen presentation showing the properties of one of the concepts shown in FIG. 1.

In accordance with the present invention, modification of multiple inheritance concept hierarchies are justified in response to the users actions with respect to FIGS. 1 and 2 using the word processing, and mouse drag-and-drop facilities common to all operating systems that support graphical user interfaces. The following concept interrelationship modifications can be performed:

1. Drag a concept leaf or intermediate concept to an intermediate concept target for Insertion. The user drags a concept to another Concept. The intent is for the source concept to KEEP its current parents and add another one by INSERTING itself between the target concept and its children (sub-concepts).

2. Drag a leaf or intermediate concept to a leaf concept or intermediate concept target. The user drags a concept to another concept. The intent is for the source concept to LOSE one or more of its current parents and then add one additional new parent by APPENDING the source to the target concept. The user does not wish the source to retain any attributes or information from its removed parentage.

3. Drag a leaf or intermediate concept to an intermediate concept target. The user drags a concept to another concept. The intent is for the source concept to LOSE one or more of its current parents and then add one additional new parent by INSERTING the source between the target concept and its children (if it has any). The user does not wish the source to retain any properties from its removed parentage.

4. Drag a leaf or intermediate concept to an intermediate concept target. The user drags a concept to another concept. The intent is for the source concept to LOSE one or more of its current parents and then add one additional new parent by making the source an additional child of the target concept. The user does wish the source to retain property declarations or constraints from its original parentage.

5. Drag a leaf or intermediate concept to an intermediate concept target. The user drags a concept to another concept. The intent is for the source concept to LOSE one or more of its current parents and then add one additional new parent by INSERTING the source between the target concept and its children (if it has any). The user does wish the source to retain any property declarations or constraints from its parentage.

Concept Deletion and Extraction Includes:

1. Delete target is a single leaf concept. The user wishes to remove a concept from the hierarchy that has no children inheriting from it. This action deletes all constraints, then local property declarations in a concept and finally deletes the concept itself.
2. Delete target is a single intermediate concept. The user wishes to remove a concept from the hierarchy including any children inheriting from it. This action deletes all constraints, then local property declarations in all descendants of a concept, deletes the descendants and finally does the same for the concept itself. Also, any properties in the hierarchy that describe a relationship to the target or any of its children are deleted. This case is basically deleting a branch or branches of the hierarchy.
3. Delete target is a single intermediate concept. The user wishes to extract a concept from the hierarchy and re-parent its children. This action deletes all constraints, then local property declarations in a concept and then deletes the concept itself. Also, any properties in the hierarchy that describe a relationship to the target are deleted. If the target concept has multiple parents, its children are re-parented to the parent directly connected to the target in the Catalog view. This case is extracting a concept from a branch.

Concept Property Deletion and Modification Includes:

1. Delete a property declaration including all its constraints in descendants. This action deletes all the property constraints in a concept and any of its descendants. Then the property declaration itself is deleted.
2. Promote a property declaration into an ancestor keeping all constraints. This feature allows the user to take an existing property declared in a concept and change the owner of the declaration to an ancestor up the hierarchy while preserving any existing constraints down the hierarchy.
3. Promote a constraint into an ancestor. This feature allows a user to take an existing constraint declared in a concept and change the owner of the constraint to an ancestor up the hierarchy.
4. Demote a property declaration into a descendent concept keeping all constraints. This feature allows the user to take an existing property declared in a concept and change the owner of the declaration to one or more of its descendants down the hierarchy while preserving any existing constraints down the hierarchy. Any constraints that no longer have access to the property declaration are deleted.
5. Demote a constraint to a descendent. This feature allows the user to take an existing constraint declared in a concept and change the owner of the declaration to one or more of its descendent down the hierarchy.
6. Promote a property across all siblings into a common ancestor keeping all constraints. This feature allows the user to take an existing property declared in a set of sibling concepts and change the owner of the declaration to a common ancestor up the hierarchy while preserving any existing constraints that may exist in the sibling concepts and their descendants. This is a macro operation on the micro operation described in 2.
7. Promote a constraint across siblings into a common ancestor. This feature allows a user to take a constraint that exists in several sibling concepts and move the constraint to a common ancestor. This is a macro operation on the micro operation described in 3. (Both 7 and 8 involve doing a search across the siblings for common property and constraint names or values and then applying the micro operations already described.)

The methodology used by the software for interactively maintaining the semantics of concept hierarchies when performing concept deletion, is shown in FIGS. 4 through 21. These figures provide an incrementally more complicated procedure for maintaining concept hierarchies. For instance, FIG. 21 builds on the method displayed in earlier figures to provide the method for recognizing and disambiguating possible semantic incoherence introduced by permitting simple drag and drop (or cut/copy and paste) operations to be used for modifying concept hierarchies.

Figure 25:
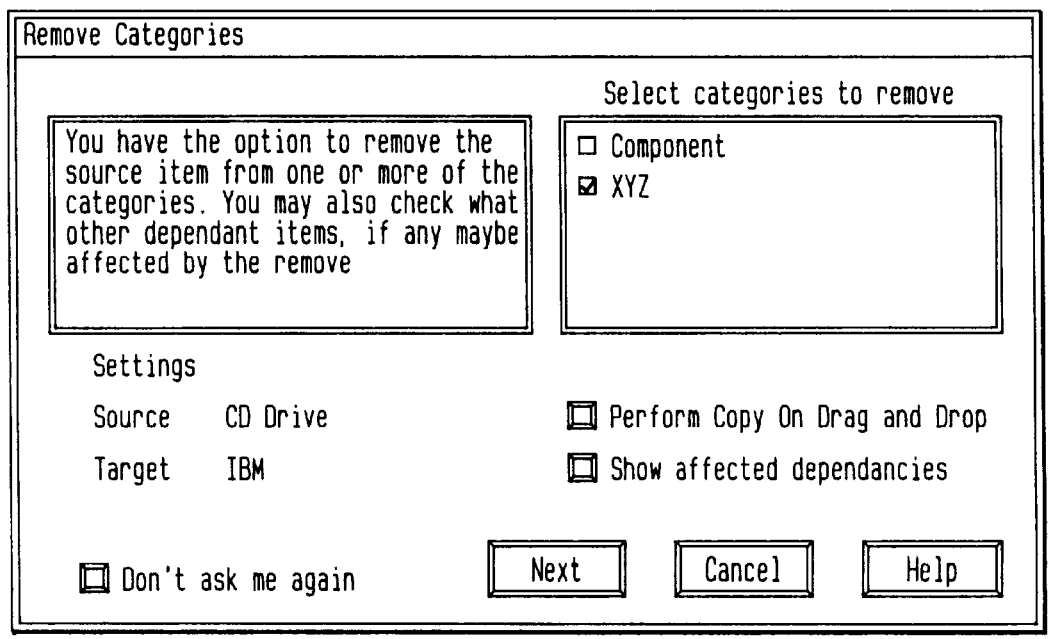
FIGS. 25 and 26 are query screens produced in connection with a drag and drop operation performed on the screen of FIG. 1.
Figure 26:
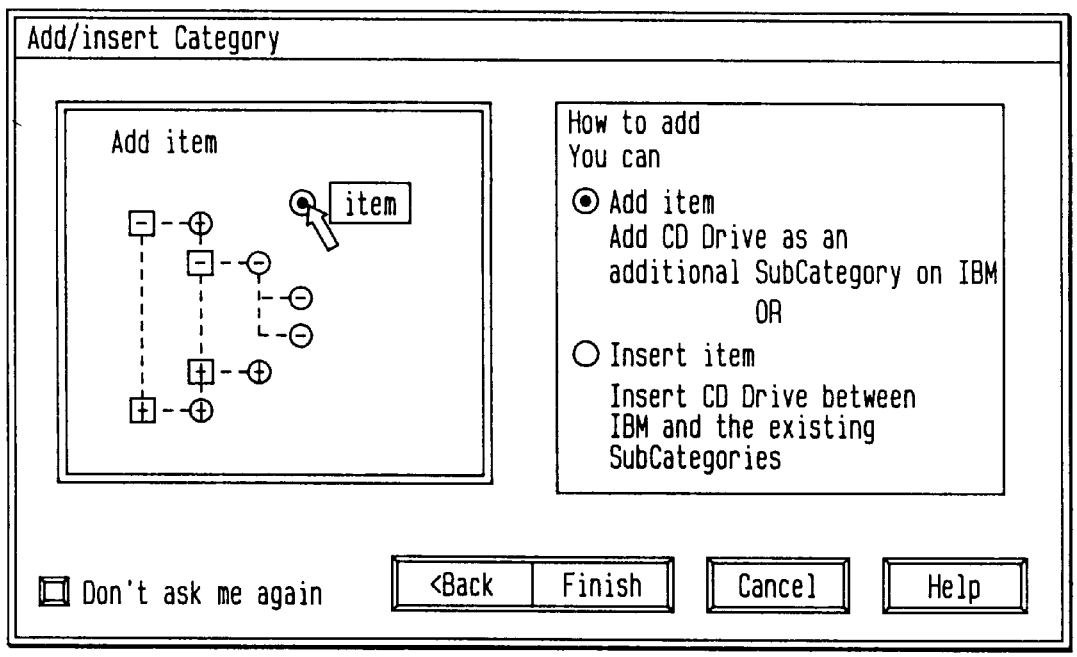

The operation is an interactive one where some of the steps shown in FIGS. 4 to 21 are performed by the computer, while the remaining steps are performed by the user in response to interrogations by the computer. Referring to FIG. 1, a drag and drop operation or a concept extraction operation would produce query screens of FIGS. 26 and 27 in the display asking the user as to the action to be taken. For instance, those who wish to eliminate XYZ Corporation as a parent for CD drive and make IBM the parent for the drive. The first query screen (FIG. 25) queries the user as to whether CD Drive is to be copied to or moved to the new parent, in addition the user may specify that concepts having a dependency on the operation to be performed are shown. The second query screen (FIG. 26) queries the user as to whether the CD Drive is to be added to the IBM concept as a child or inserted between the IBM and Hard Disk concepts, making CD Drive a child of IBM but a parent of Hard Disk.

Figure 27:
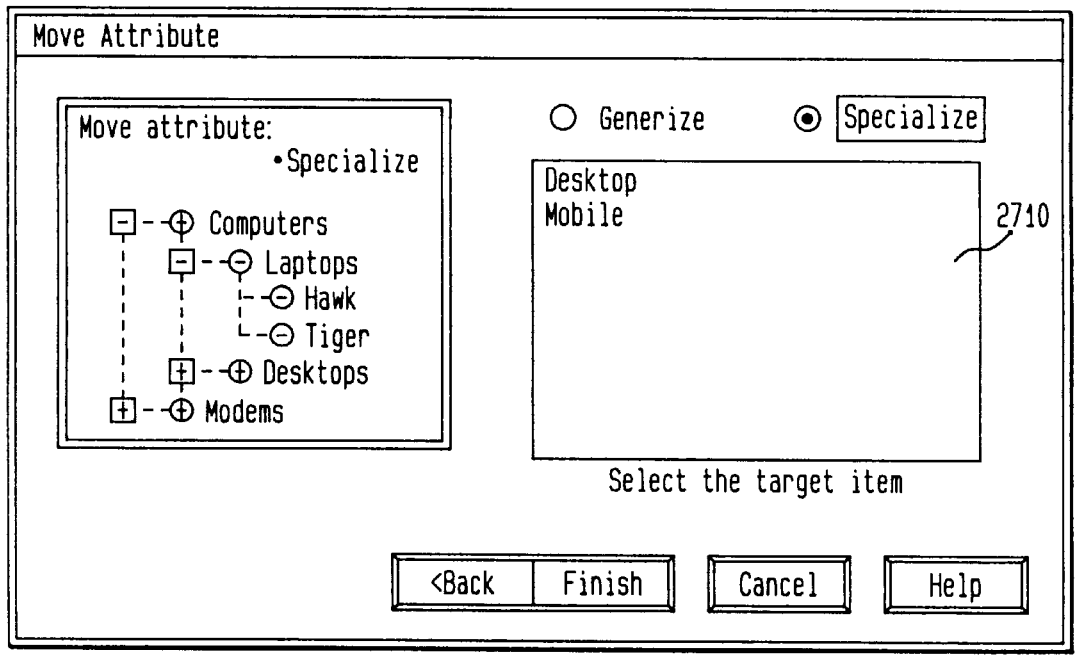
FIG. 27 is a query screen produced in response to an action taken in connection with FIG. 2.

Similarly, if the user deleted the declaration of the property "Color" in the "Computer" concept shown in FIG. 2, the query box shown in FIG. 27 would appear, requesting that the user inform the computer if color=black and color=white in "Mobile" and "Desktop" are to be removed or moved to a sub-concept. The "Move" option in FIG. 27 produces the two selections in space 2710, either or both can be selected.

Figure 4:
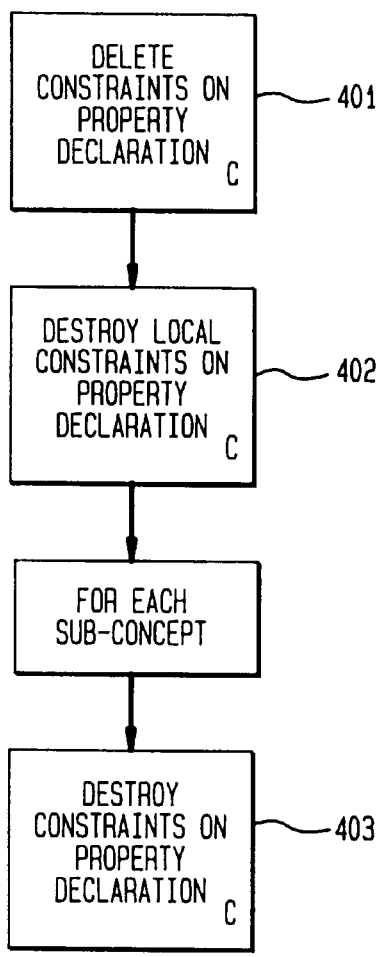
FIGS. 4 to 21 are flow diagrams of the functioning of a computer in accordance with the present invention.
Figure 5:
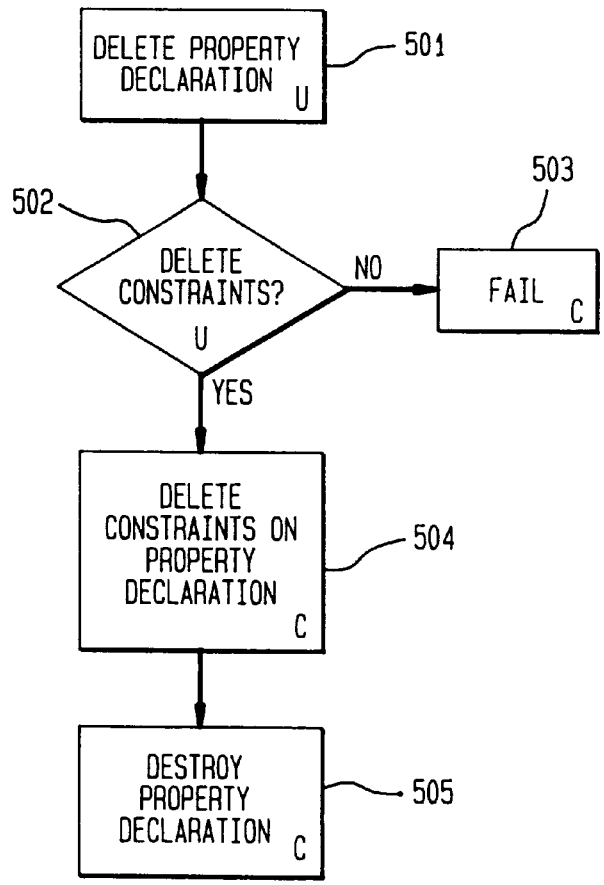

As pointed out above, FIGS. 4 to 21 show various actions taken by the computer in response to actions taken by the user. Certain of the figures contain titles for steps that reflect the title of other figures. In such cases, the steps containing such titles include the steps of the other figure. Referring to FIGS. 4 and 5, the removal of a property declaration by the user, results in destruction by the computer of constraints on the property declaration 401. Firstly, by destroying 402 all local constraints on that declaration and secondly, by destroying 403 the constraints for each sub-concept of that concept having the declaration. For example, removing the property "Battery Life" in the "Mobile" concept of FIG. 3 results in removal batt life=2.0 and batt life=2.5 of the "Notebook" and "Tablet" concepts. This is done automatically by the computer.

Figure 6:
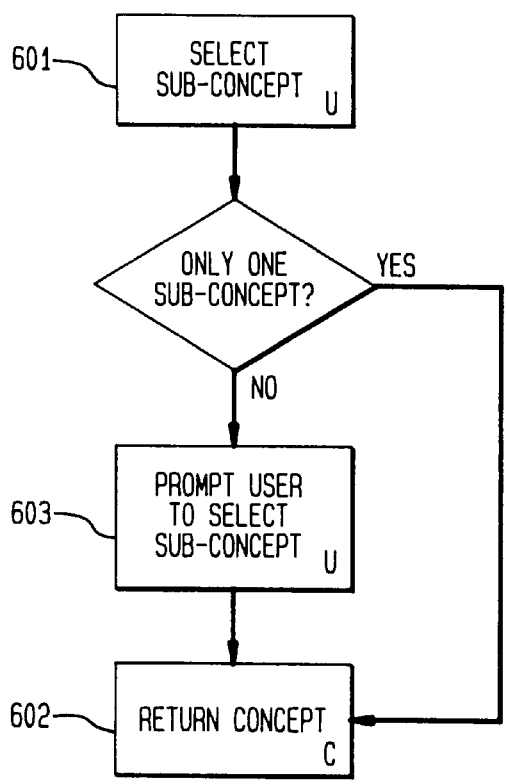
Figure 10:
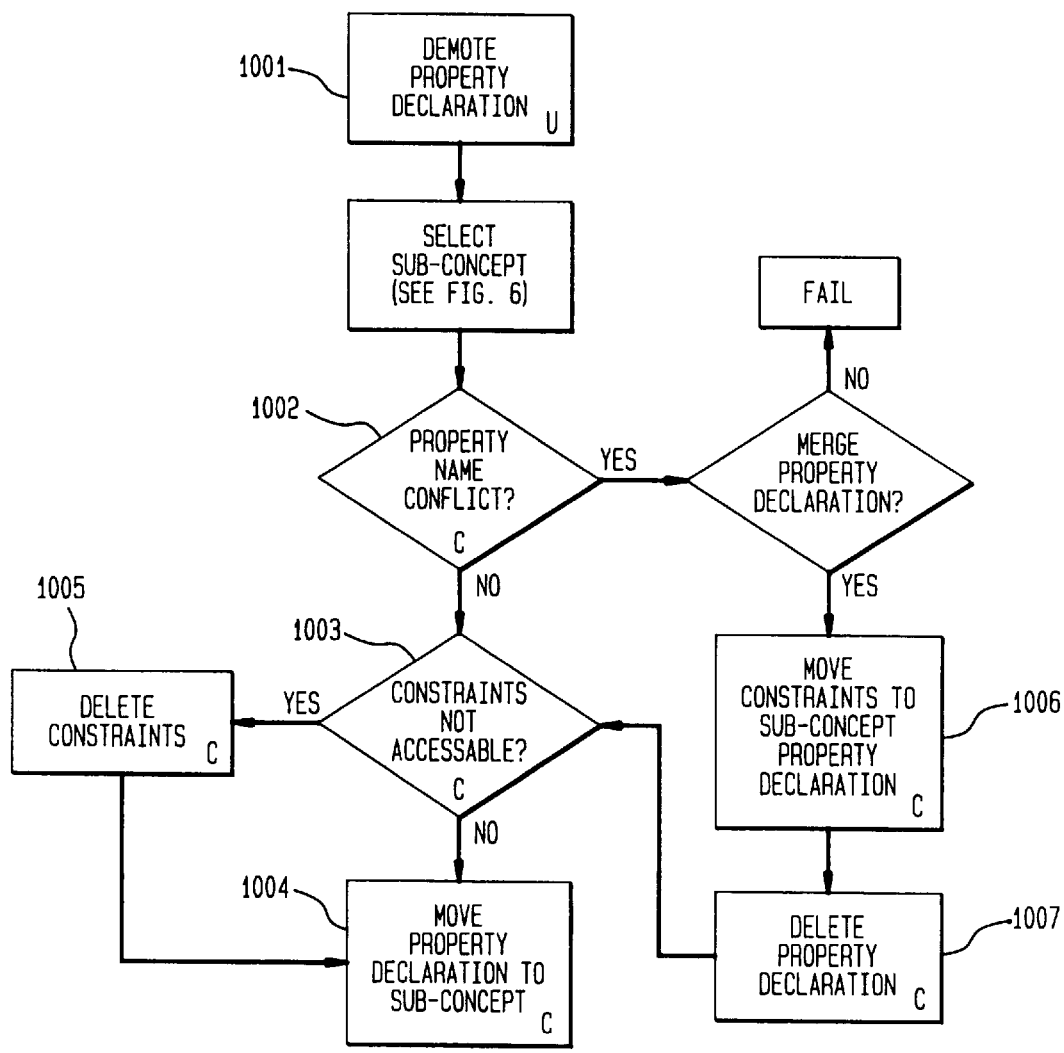
Figure 11:
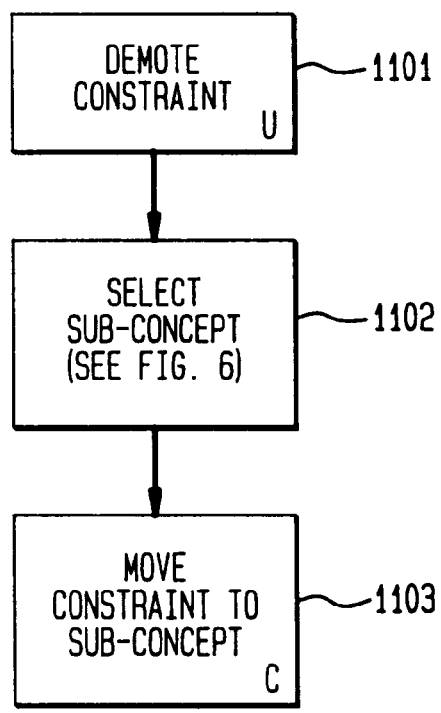

FIG. 6 is a subroutine in FIGS. 10 and 11 for the user selecting a sub-concept 601 to attach to a concept. If there is only one sub-concept, the machine automatically attaches it to the concept. If there is more than one, the user is pointed through the space in a screen, such as the one in FIG. 26, to select a sub-concept, and then attaches the selected sub-concept.

Figure 7:
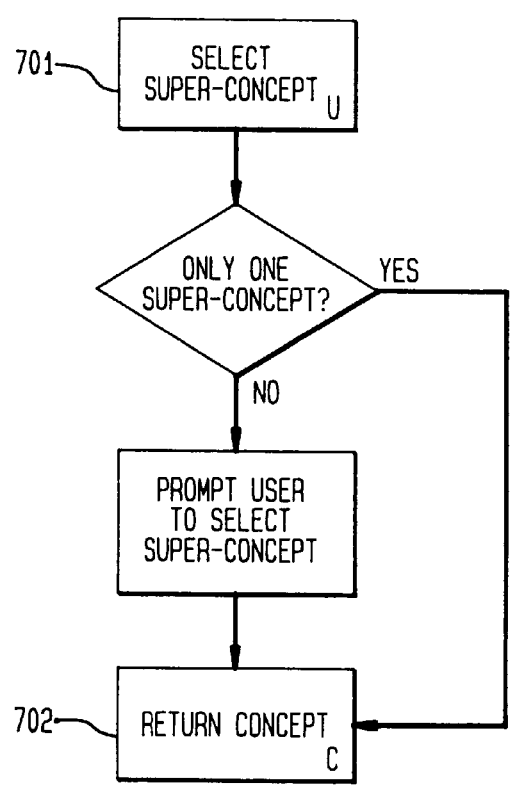
Figure 8:
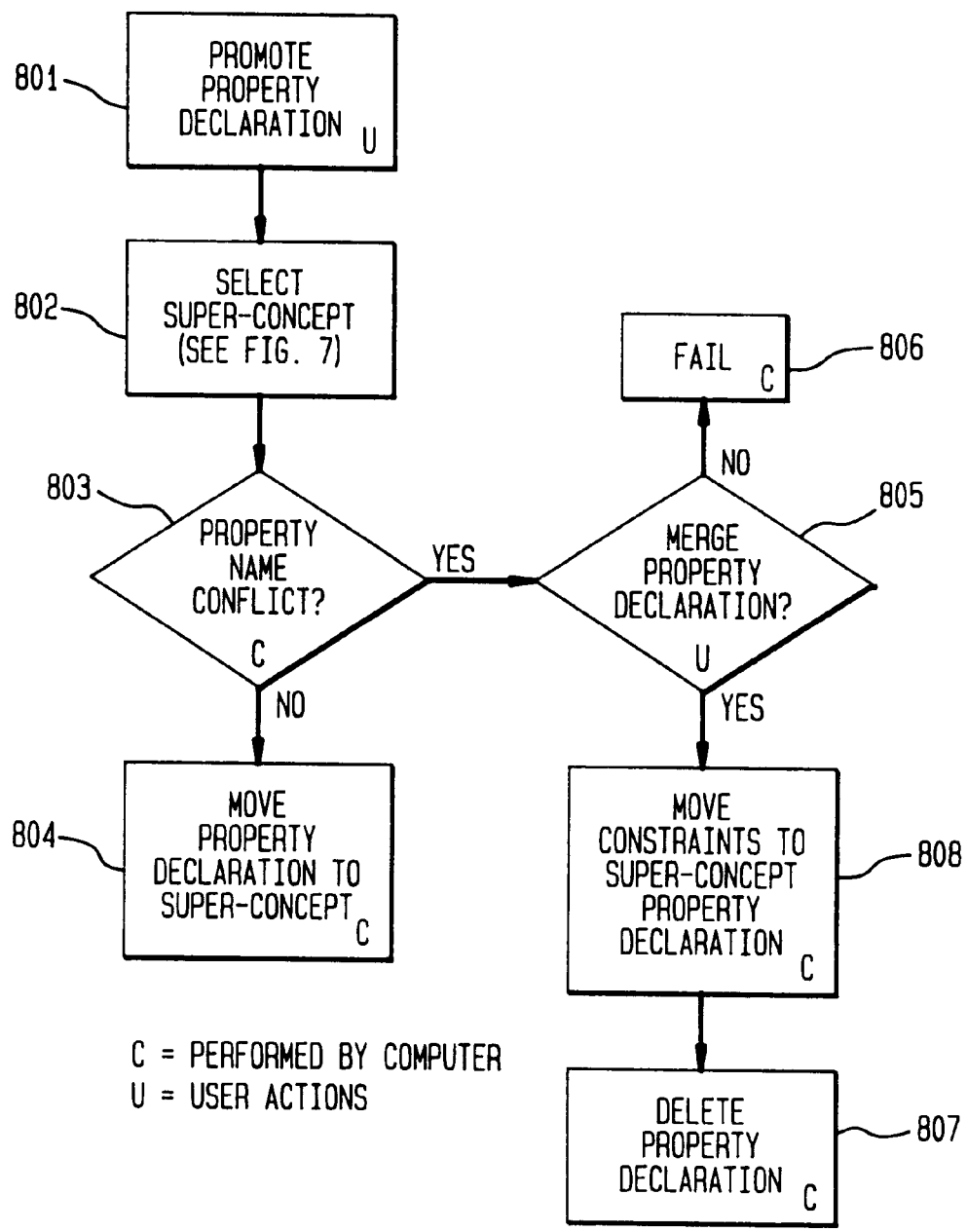
Figure 9:
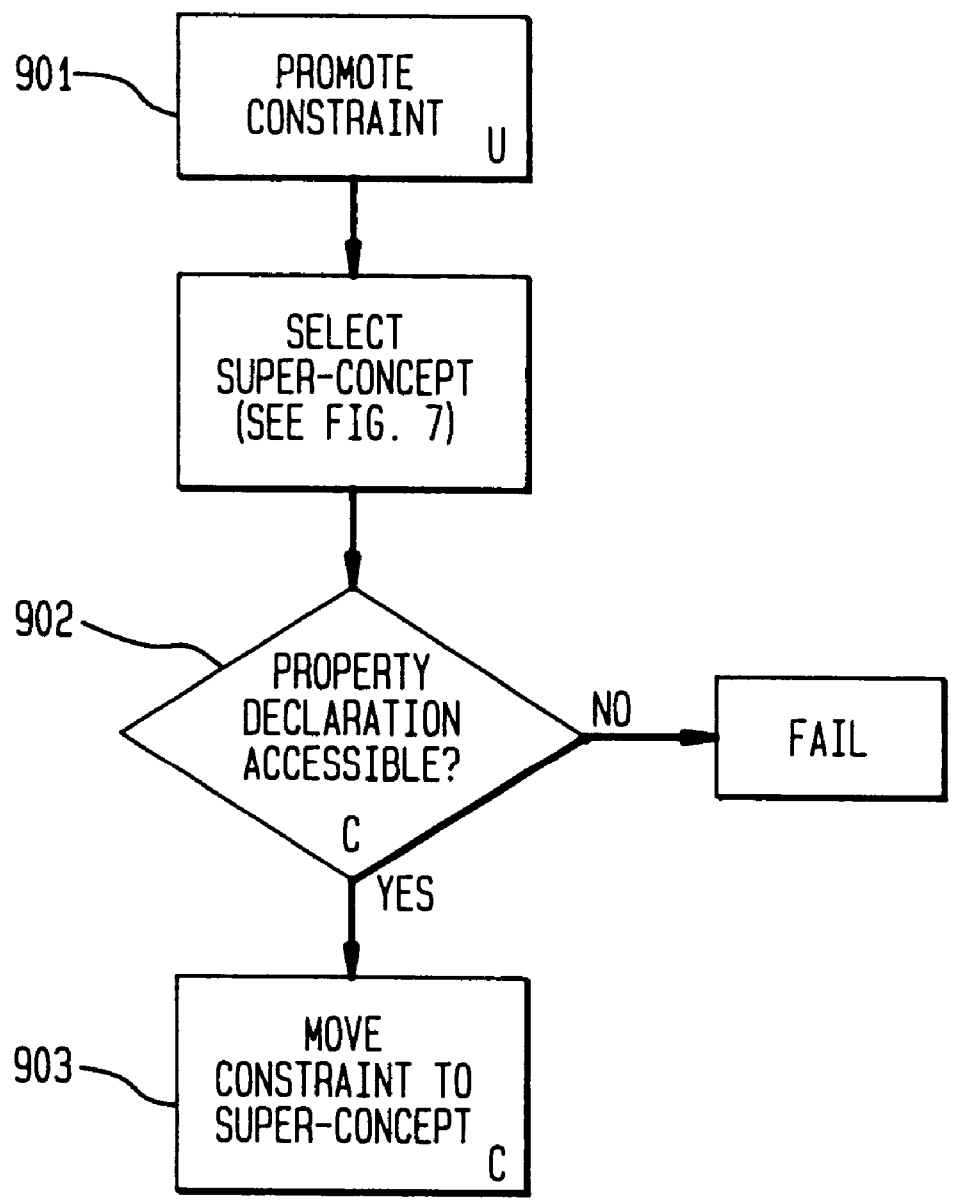

FIG. 7 is a subroutine in FIGS. 8 and 9 where the user is selecting a super-concept 701. If there is only one super-concept, the computer will automatically couple it to the concept 702. However if there is more than one, the computer through a query space, such as the one in FIG. 26, prompts the user to select the proper super-concept after which it automatically connects that super-concept up to the concept.

FIG. 8 is where the user elects to promote a property declaration from a concept to a super-concept. After a user selection of the super-concept 802, the computer checks to see if this results in a name conflict 803, and if it does not, moves the declaration to the super-concept 804. If there is a conflict, the user is asked if the declarations can be merged 805. If they cannot, the process fails 806. If the properties can be merged, the property declaration to be moved is deleted 807, and its constraints are moved to the property declaration of the super-concept 808.

FIG. 9 shows action of the computer in response to promotion of a constraint 901. An example of this, would be to promote the constraint "Black" for the declaration "Color" in the concept "Mobile" to the concept "Computer". If such a move were to be made, not only "Mobile" but "Desktop" computers would have to be black. Thus, if the computer decides that the property declaration is accessible 902, the restraint black is moved 903 to "Computer".

When the user selects to demote a property declaration 1001, the computer reacts as shown in FIG. 10. If there is no property name conflict 1002 and the constraints are accessible 1003, the computer moves the property declaration to the sub-concept 1004. If the constraints are not accessible, the computer deletes the constraints 1005 prior to moving the property declaration 1004. If there is a name conflict, and merging is possible and decided upon by the user, the computer moves the properties constraints from the source concept to the sub-concept property declaration 1006, and deletes the selected property declaration 1007. An example of demoting a declaration would be to move the declaration "Color" from the concept "Computer" to the concept "Mobile". Then the declaration "Color" and its constraint "Black" would both occur in the concept "Mobile". The concept "Desktop" would then no longer have a color constraint.

FIG. 11 shows where a user elects to demote constraint 1101. An example of this would be to move the color "Black" from the concept "Mobile" to the leaf concept "Notebook". Upon selection, the users selection of the sub-concept 1102, the constraint is moved 1103 leaving "Tablet" free of the constraint "Black".

Figure 12:
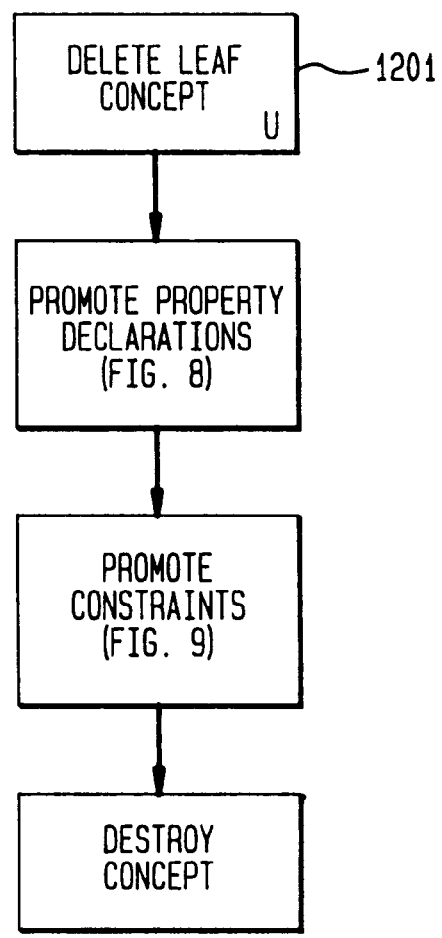

In FIG. 12, the user elects to delete a leaf concept 1201, such as "Desktop". In response to that deletion, the computer promotes property declarations such as "CD ROM" to the "Computer" concept.

Figure 13:
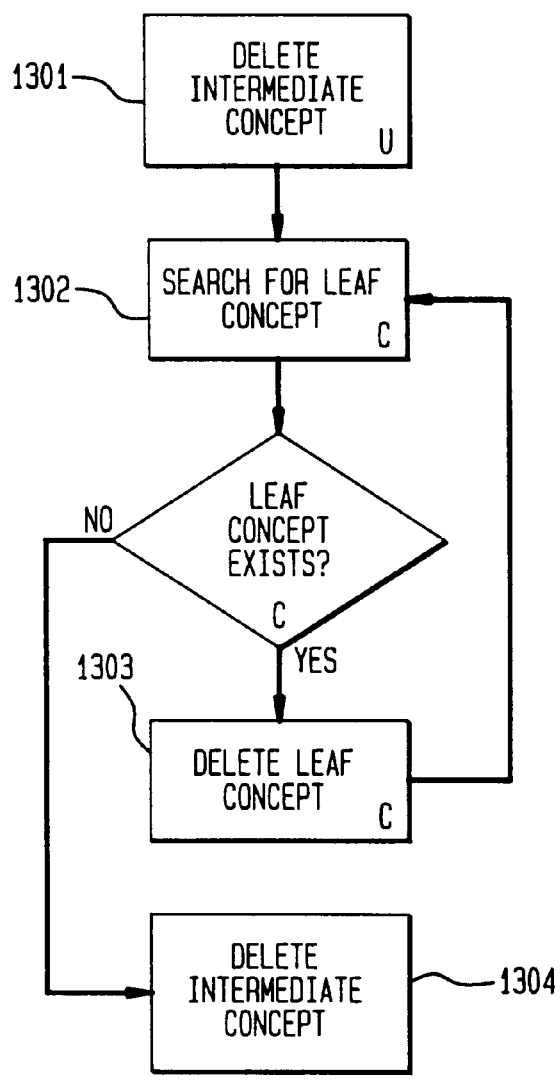

In FIG. 13, if the user selects to delete an intermediate concept 1301, the computer searches for sub-concepts and deletes them once all sub-concepts are destroyed it destroys the concept 1304.

Figure 14:
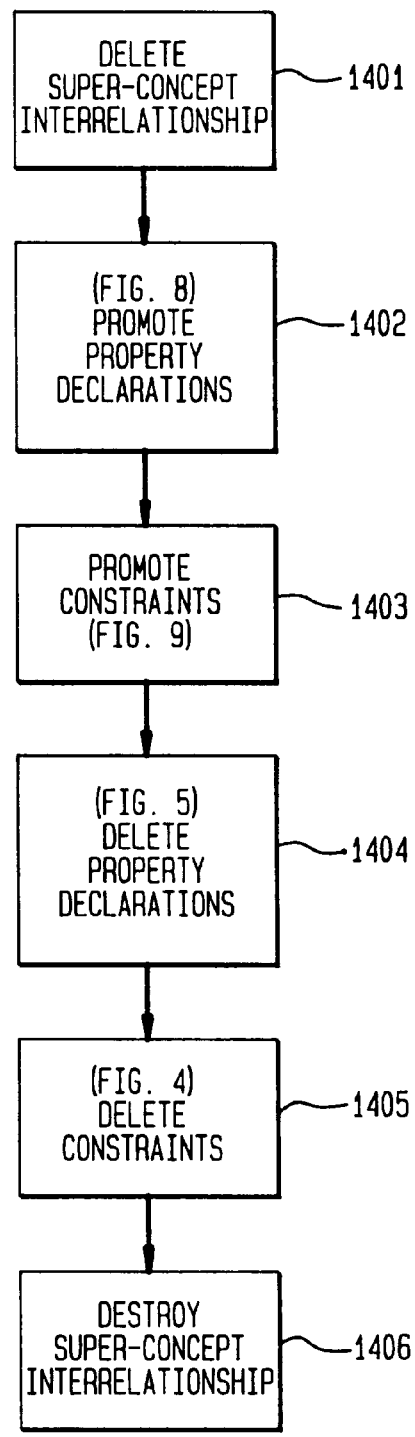

FIG. 14, is a subroutine relying on other subroutines to delete a super-concept interrelationship. The computer promotes property declarations of constraints 1402 and 1403 to another super-concept relationship. Alternatively, if there is no such super-concept, delete those property declarations and constraints 1404 and 1405 and finally destroy the super-concept interrelationship 1406. For instance, if the concept "Computer" was to be deleted in the tree of FIG. 3, the declarations Form Factor", "Color" and Fixed Disk" would be deleted rather than promoted to a higher super-concept.

Figure 15:
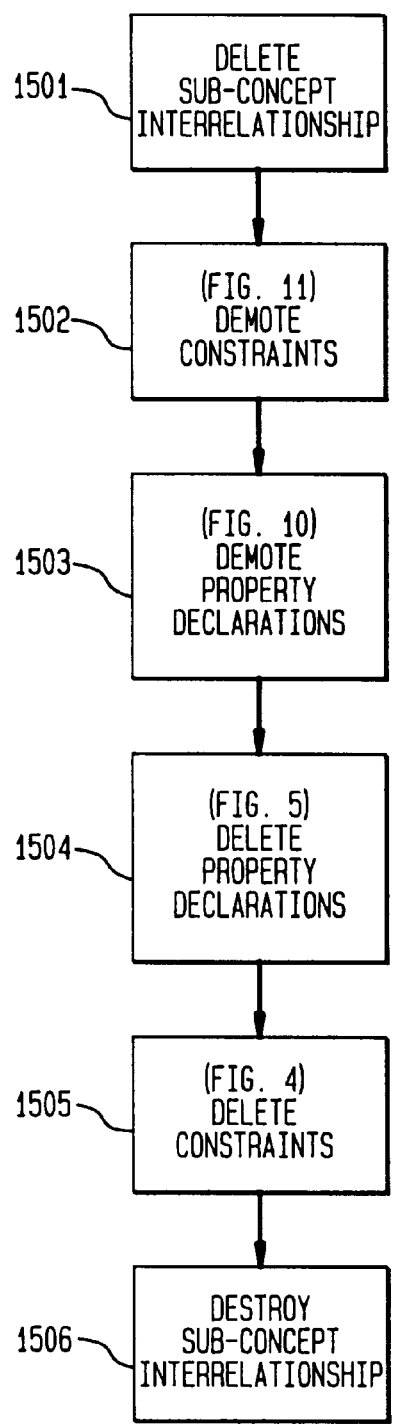

FIG. 15 is a subroutine relying on other subroutines to delete a sub-concept relationship 1505. The system demotes property constraints and declarations 1502 and 1503, where applicable, but deletes inapplicable property declarations and constraints 1504 and 1506. Finally, it destroys the sub-concept relationship 1506.

Figure 16:
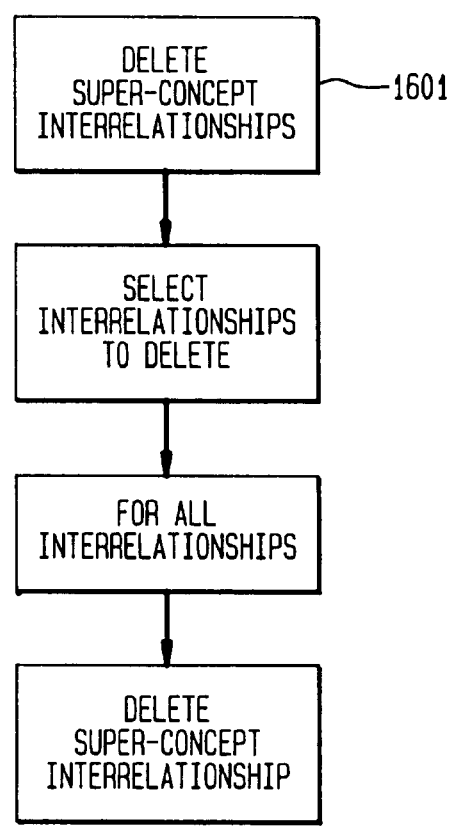

FIG. 16 is a subroutine relying on other subroutines to be used where super-concept interrelationships are to be deleted 1601 without deleting the concept. Such a case can be seen in FIG. 3 where relationship of "Tablet" to "Mobile" would be terminated so that concept "Tablet" would depend directly from the concept "Computer".

Figure 17:
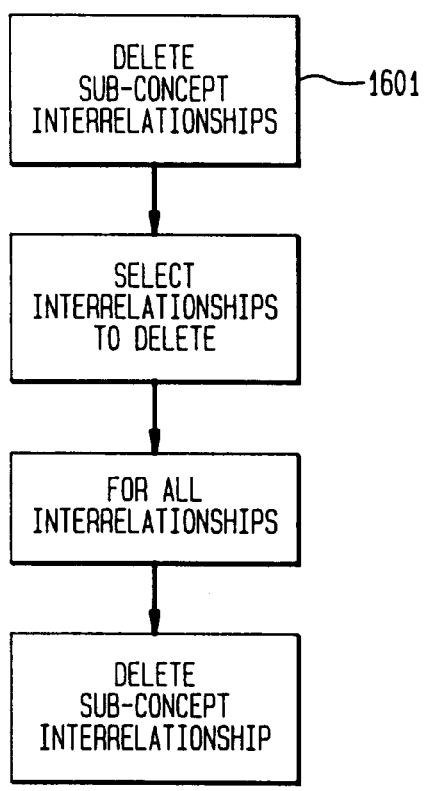

In FIG. 17, is a subroutine relying on other subroutines to be used where concept interrelationships are to be deleted.

Figure 18:
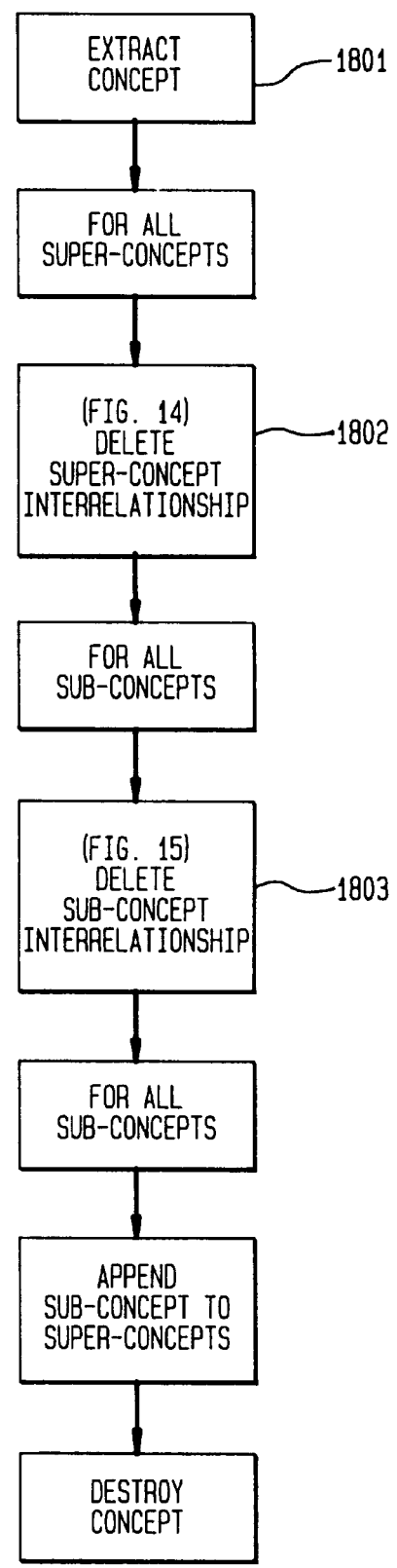

In FIG. 18, the user wishes to delete a concept 1801. This would be illustrated by removing "Mobile" as a concept in FIG. 3. In so doing, the "Notebook" and "Tablet" concepts can get appended directly on "Computer" after all super-concept and sub-concepts to "Mobile" have been deleted 1802 and 1803.

Figure 19:
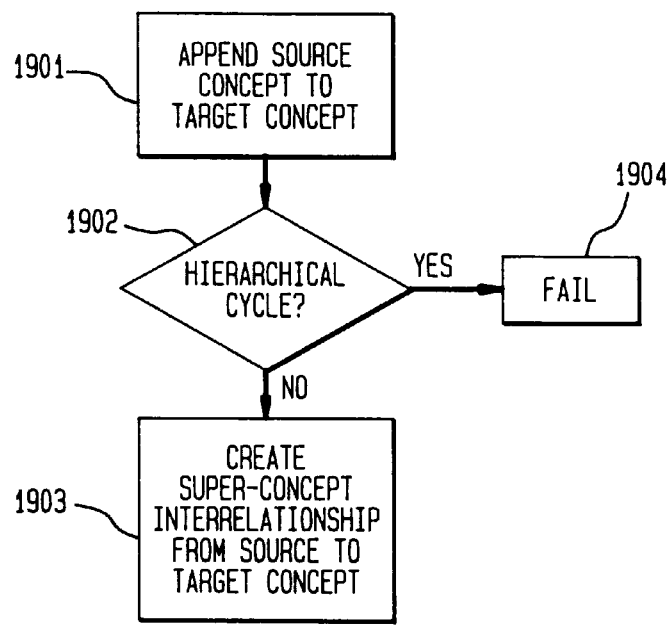

FIG. 19 illustrates the situation where the user wishes to append a source concept to a target concept 1901. An example for that in FIG. 3 would be to append the CD drive concept to IBM concept. The computer checks to see if this causes a hierarchial cycle. If it determines that no hierarchial cycle exists 1902, it creates the relationship of IBM being super-concept for CD drive 1903, otherwise the process fails 1904.

Figure 20:
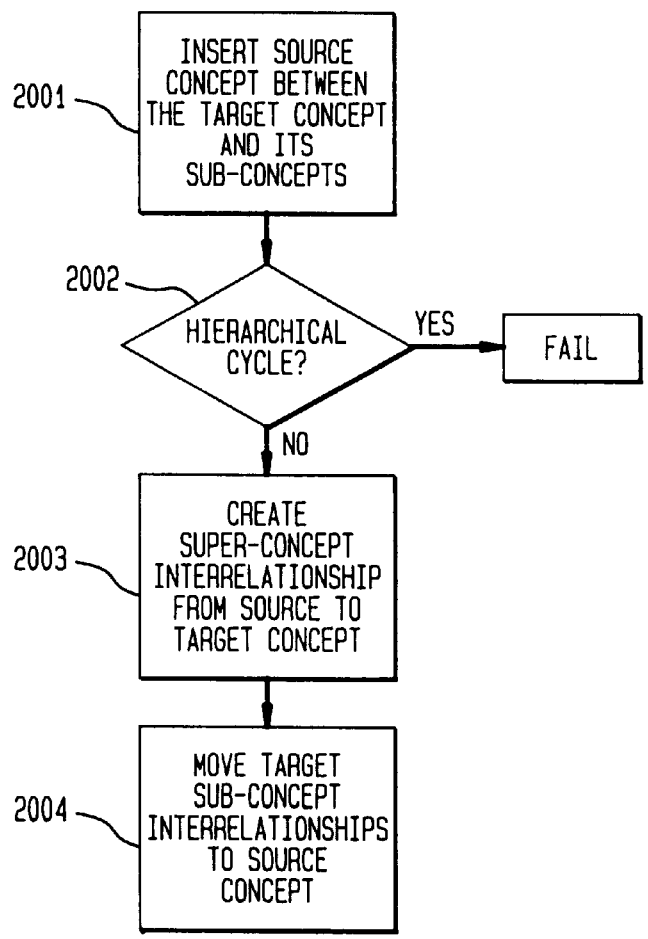

In FIG. 20, the user elects to insert a source concept between the target concept and concept 2001. In FIG. 3 if the concept "Mobile" was not in existence, this process would involve insertion of the "Mobile" concept between target concept "Computer" and its sub-concepts "Notebook" and "Tablet". The computer searches the hierarchy for a hierarchial cycle 2002, and if none exists, inserts the "Mobile" 1 concept by creating a super-concept interrelationship between "Computer" and "Mobile" and sub-concept interrelationship between "Notebook.", "Tablet" and "Mobile" 2004.

Figure 21:
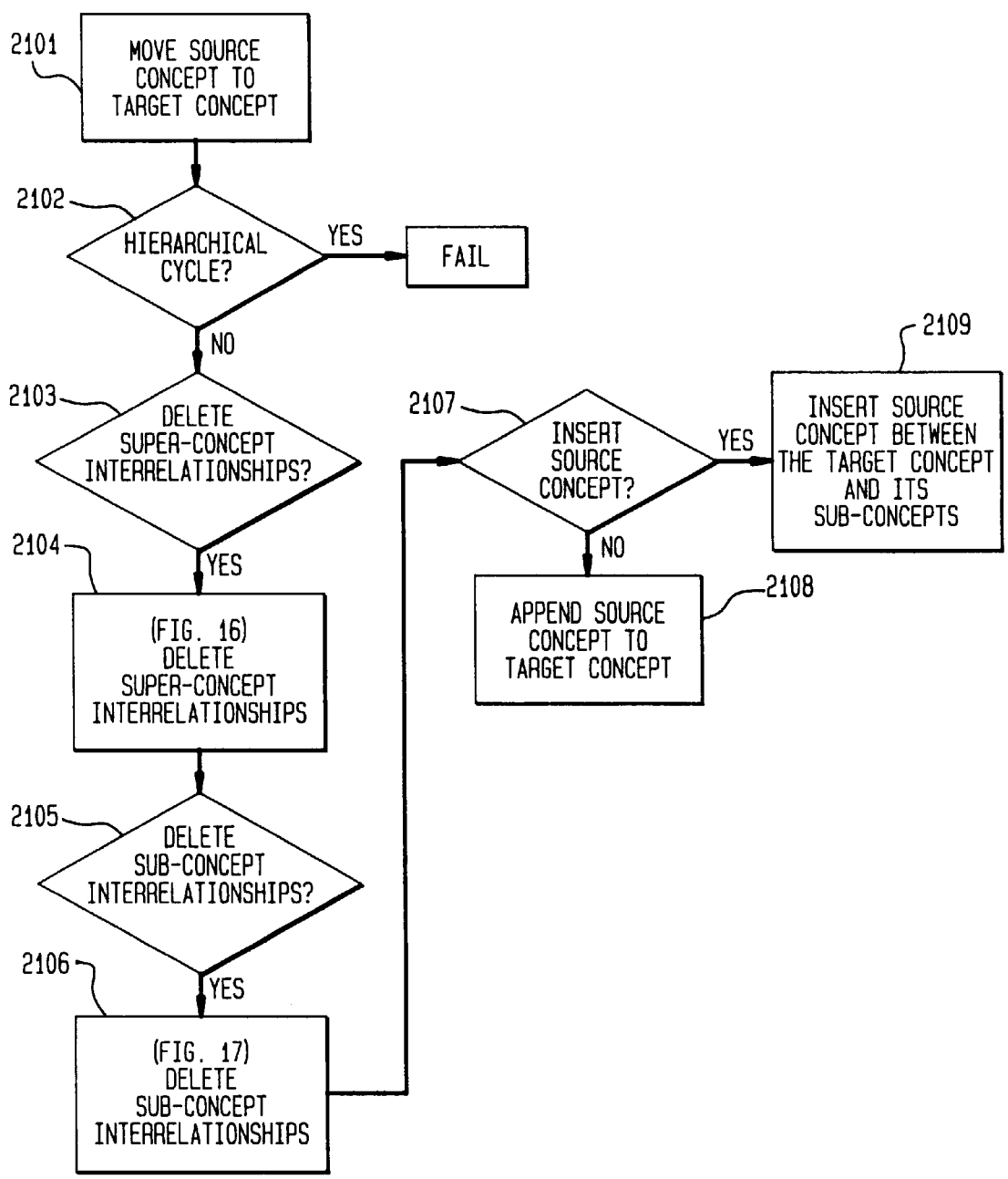
Figure 22:
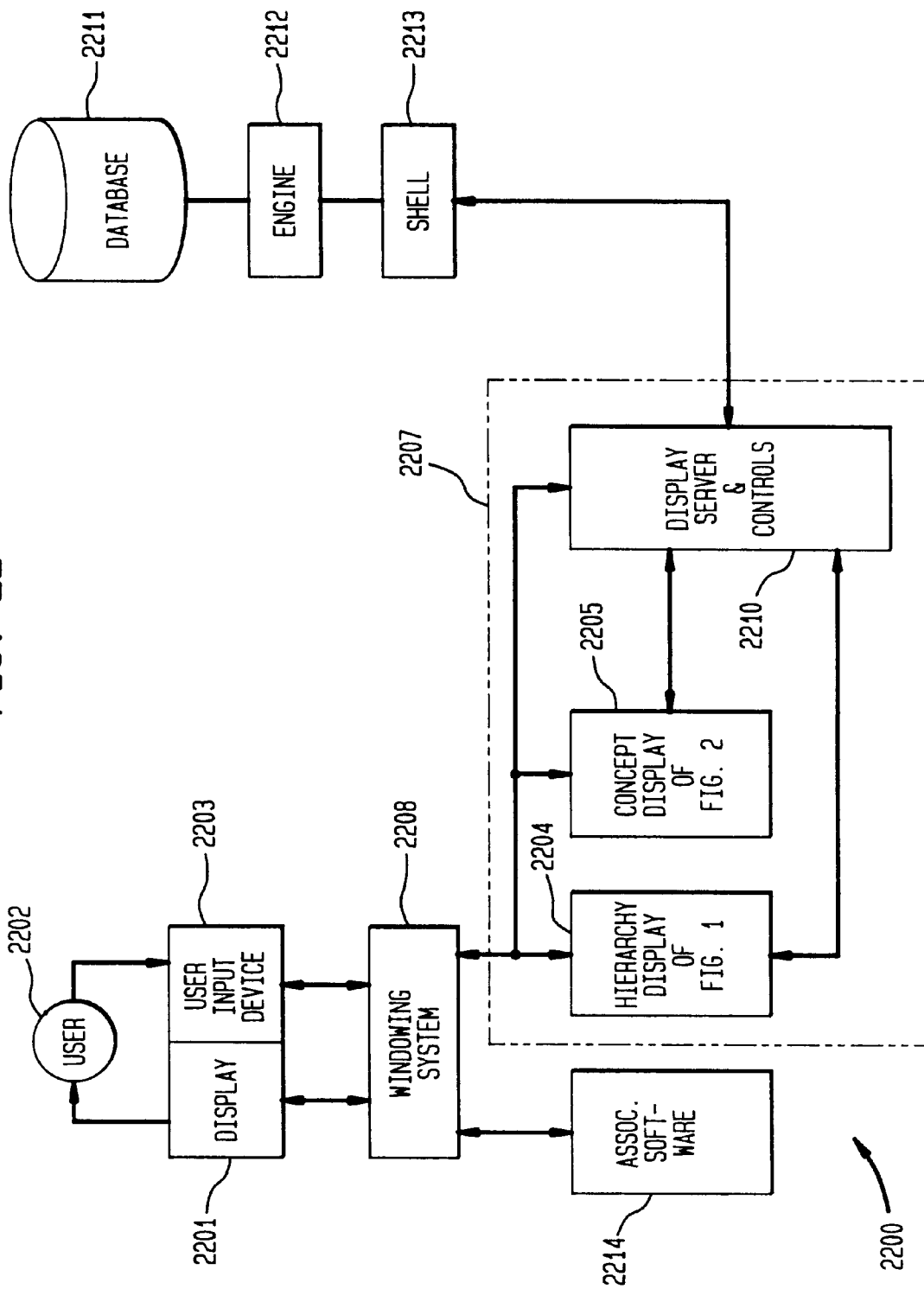
FIG. 22 is a logic block diagram indicating the functioning of a computer in accordance with the present invention.

In FIG. 21, the user elects to move a source concept to a target concept 2101. The computer examines the hierarchy for hierarchial cycles 2102 and if there is none created by the move, it queries the user if he wishes to delete any super-concept interrelationship 2103. If the answer is yes, he deletes the super-concepts interrelationships 2104. The computer then queries the user about deleting the sub-concept interrelationships 2105. If the answer again is yes, it deletes the sub-concept relationships 2106. The next query is whether to insert the source concept 2107. If the answer is no, it appends the source concept to the target concept 2108. If the answer is yes, it inserts the source concept between the target concepts and its sub-concepts 2109.

Figure 23:
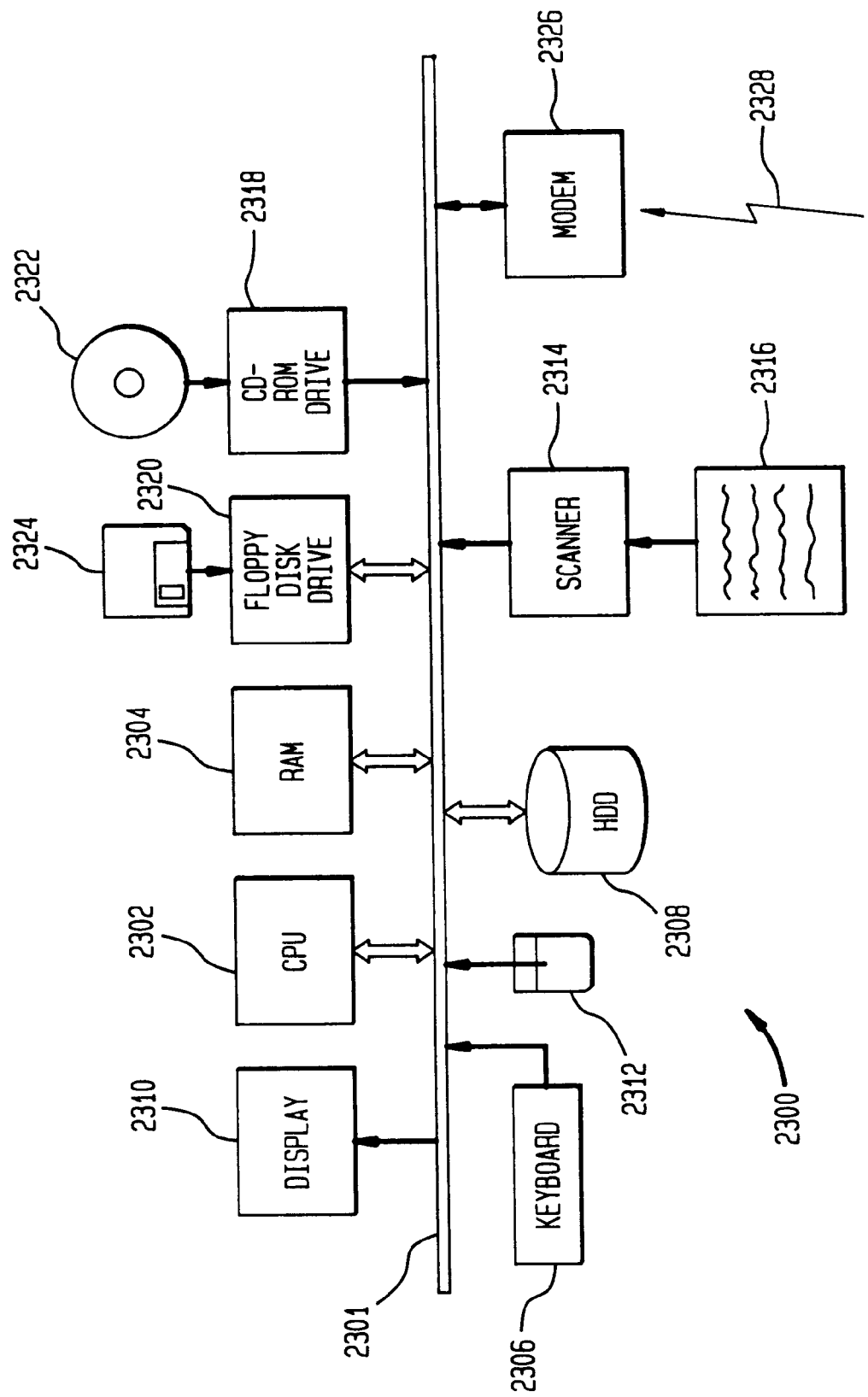
FIG. 23 is a block diagram of a computer system containing the present invention.

Referring now to FIG. 23, the system 2300 includes a computer display screen 2301 which interacts with the user 2302 through commands entered through user input device 2303 (such as a mouse and keyboard) to present the screens 2304 and 2305 shown in FIGS. 1 and 2, respectively. The displays are provided by a search engine 2307 in response to control signals inputted by the user 2302 through the user interface device 2303. A windowing system 2308, such as the Windows NT or 95 operating systems of Microsoft Corporation, acts as an intermediary between the search engine 2307 and the user input device 2303 and display 2301. The search engine 2307 includes the displays 2304 and 2305, a display server 2310 for populating the displays of FIGS. 1 and 2 with data including that placed in the query list space 104 and 202 when they are invoked. The display server 2310 receives data from the database 2311 serviced by the database engine 2312 through a hierarchial shell 2313, such as one provided in accordance with the above mentioned U.S. patent application 08/472,414 (Applicants' docket number CT9-95-002).

Though a software embodiment is provided in the present embodiment certain of the functions could be embodied in hardware.

The present invention is capable of running on any properly configured general purpose computer system, such as the one shown in FIG. 28. Such a computer system 2300 includes a processing unit (CPU) 2302 connected by a bus 2301 to a random access memory 304, a high density storage device 2308, a keyboard 2306, a display 310 and a mouse 312, such as Mouse Port Compatible Mouse 2.0A of the Microsoft Corporation. Also attached to the CPU 2302 by the bus 2301, are a scanner 2314 for scanning documents 2316 into the computer 2300; and CD-ROM and magnetic disc drivers 318 and 320 for entry of information from optical and floppy magnetic discs 2322 and 2324 containing program code and data. An example of such a computer is an IBM Personal Computer of the International Business Machines Corporation, such as an Aptiva L31 Model with a 233 MHz Pentium processor of Intel Corporation operating under Microsoft Windows 95 operating system of the Microsoft Corporation.

The computer 2300 also contains a modem 2326 for telecommunication of information 2328 on the Internet and other networks. Computers 2300, like the one described above, are connected together in a network by a server that can be used to exchange information and one computer can access information contained in another. The screens, the database and the search engine may be permanently located on all computers of the network, or one or all can be transmitted from one computer to another computer when the computer database is to be accessed.

Figure 24:
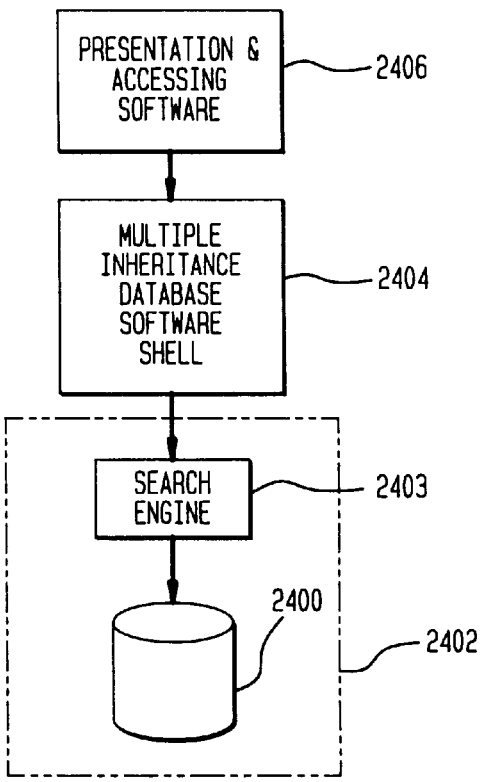
FIG. 24 is a block diagram of a data base system to which the present invention applies.

As shown in FIG. 24, the data 2400 is stored in a database 2402, such as the DB2 Relational Database of International Business Machines Corporation. It is accessed through the database search engine 2403 and a multiple-inheritance concept hierarchy shell 2404 configured in the manner described in copending U.S. patent application Ser. No. 08/427,414 and entitled "Method and Apparatus for Representing Knowledge About Entities" (Applicants Docket No. CT9-95-002). The data 2400 in the database 2402 can be accessed from Windows 95 compatible graphical user interface on the display 2310 of FIG. 23 with screens provided in accordance with the present invention.

Above we have described an embodiment of the invention and modifications of the invention obvious to those skilled in the art, and therefore it is understood that the invention also covers embodiments within the spirit and scope of the appended claims.

We claim:

1. A computer system including software for maintaining a multiple inheritance concept hierarchy of a computer database of the computer system through graphical user interface screens used to display on a display screen views of the hierarchy comprising:

modification software responsive to user interaction with the one or more of the graphical user interface screens for modification of both the hierarchial configuration of, and data stored in, the database to complete changes requested by said interactions including:

display screen software for presenting queries on the display screen interrogating the user for more information about the proposed modification; and correction software responsive to the user interaction and any user response to the queries on the display screen to modify the arrangement of data stored in the database to disambiguate any ambiguities resulting from said user interaction.

2. The computer system of claim 1 wherein said graphical user interface screens include both a hierarchial tree view of the concepts and property declaration and constraint views of the concepts.

3. The computer system of claim 2 wherein said user interaction is a drag and drop operation made in connection with the hierarchial tree view.

4. The computer system of claim 3 wherein said drag and drop operation involves dragging a concept in the hierarchial tree view to another concept in the hierarchial tree view.

5. The computer system of claim 4 wherein said logic software includes code for inserting the dragged concept between said another concept and sub-concepts of said another concept.

6. The computer system of claim 4 wherein said modification software includes code for appending the dragged concept to said another concept.

7. The computer system of claim 6 wherein said display screen software includes code for generating query screens querying the user if the user wishes the dragged concept to retain properties or attributes of its prior super-concepts and said correction software includes code for deleting or retaining said properties or attributes at the users election made in response to those query screens.

8. The computer system of claim 2 wherein said user interaction is an add or delete operation made with respect to one of said property views of a concept.

9. The computer system of claim 8 wherein said user interaction is an add interaction to a super-concept to add a property or a constraint to said concept.

10. The computer system of claim 9 wherein said correction software includes code to add a property or constraint to one or more of the sub-concepts of said super-concepts.

11. The computer system of claim 10 wherein the content data property or declaration is in one of said sub-concepts.

12. The computer system of claim 11 wherein the property or declaration is added all of said sub-concepts by said user interaction.

13. A computer program product comprising:

a computer useable medium having computer readable code embodied therein for maintaining a multiple inheritance concept hierarchy of a computer database through software generated graphical user interface screens used to display on a display screen views of the hierarchy;

modification software responsive to user interaction with the one or more of the graphical user interface screens for modifying both of the configuration of, and the data stored in, the database to complete changes requested by said interactions including:

display screen software for presenting one or more query screens on the display screen that interrogate the user for more information about the proposed changes; and correction software responsive to the user interaction and user response to questions on the query screen to modify the data in the database to disambiguate any ambiguities in the data content of the database resulting from said user interaction.

14. The computer program product of claim 13 wherein said software generated graphical user interface screens includes both a hierarchial tree view of the concepts of the hierarchy and property declaration and constraint views of the concepts.

15. The computer program product of claim 14 wherein said user interaction is a drag and drop operation made in connection with the hierarchial tree view by dragging a concept in the hierarchial tree view to another concept in the tree view.

16. The computer program product of claim 15 wherein said logic software includes code for inserting the dragged concept between said another concept and one or more sub-concepts of said another concept.

17. The computer program product of claim 16 wherein said modification software includes code for appending the dragged concept to said another concept.

18. The computer program product of claim 14 wherein said display screen software includes code for generating query screens querying the user if the user wishes the dragged concept retain properties or attributes of its prior super-concepts and said correction software includes code for deleting or retaining said properties or attributes at the users election made in connection with the query screens.

19. The computer program product of claim 14 wherein said user interaction is an add or delete operation made with respect to one of said property views of a concept.

20. The computer program product of claim 19 wherein said user interaction is an add interaction to a super-concept to add a property or a constraint to said super-concept.

21. The computer program product of claim 20 wherein said correction software includes code to add properties or constraints to sub-concepts of said super-concepts.

* * * * *